(12) United States Patent
Miyamoto

(10) Patent No.: US 9,225,869 B2
(45) Date of Patent: Dec. 29, 2015

(54) IMAGE READING DEVICE AND IMAGE FORMING APPARATUS

(71) Applicant: BROTHER KOGYO KABUSHIKI KAISHA, Nagoya-shi, Aichi-ken (JP)

(72) Inventor: Yusuke Miyamoto, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/839,982

(22) Filed: Mar. 15, 2013

(65) Prior Publication Data

US 2013/0329265 A1     Dec. 12, 2013

(30) Foreign Application Priority Data

Jun. 8, 2012   (JP) ................................. 2012-131179

(51) Int. Cl.
| | |
|---|---|
| *H04N 1/04* | (2006.01) |
| *H04N 1/12* | (2006.01) |
| *H04N 1/10* | (2006.01) |
| *H04N 1/193* | (2006.01) |

(52) U.S. Cl.
CPC .............. *H04N 1/121* (2013.01); *H04N 1/0464* (2013.01); *H04N 1/1017* (2013.01); *H04N 1/193* (2013.01)

(58) Field of Classification Search
CPC ....... H04N 1/193; H04N 1/17; H04N 1/0402; H04N 1/1013; H04N 1/047
USPC ................ 358/486, 408, 496, 497, 474, 1.13; 382/312, 318, 319; 250/234–236; 318/696, 685

See application file for complete search history.

(56) References Cited

U.S. PATENT DOCUMENTS

| | | | | |
|---|---|---|---|---|
| 4,866,531 | A | * | 9/1989 | Kobori et al. ................. 358/400 |
| 5,206,737 | A | * | 4/1993 | Sugiyama ..................... 358/296 |
| 5,226,639 | A | * | 7/1993 | Kida et al. .................... 271/109 |

(Continued)

FOREIGN PATENT DOCUMENTS

| | | |
|---|---|---|
| CN | 101742043 A | 6/2010 |
| JP | S62-136167 A | 6/1987 |

(Continued)

OTHER PUBLICATIONS

U.S. Office Action issued in related U.S. Appl. No. 13/842,841, Mar. 20, 2014.

(Continued)

*Primary Examiner* — Cheukfan Lee
(74) *Attorney, Agent, or Firm* — Merchant & Gould PC

(57) ABSTRACT

An image reading device includes: a feeding unit; a carriage for holding and moving a reading unit; a motor-side transmission gear for transmitting a power from a motor; a feeding unit-side transmission gear for transmitting the power to the feeding unit; a carriage-side transmission gear for transmitting the power to the carriage; a switching gear switched between a carriage-side position where the motor-side and the carriage-side transmission gears are coupled and a feeding unit-side position where the motor-side and the feeding unit-side transmission gears are coupled; and a control unit for performing: a prediction process of predicting whether a carriage read mode will be executed before receiving a reading start instruction; and a switching process of switching the switching gear to the carriage-side position in a case where the carriage read mode is predicted to be executed.

8 Claims, 9 Drawing Sheets

(56) References Cited

U.S. PATENT DOCUMENTS

| | | | |
|---|---|---|---|
| 5,862,446 A * | 1/1999 | Hashizume et al. | 399/367 |
| 5,917,616 A * | 6/1999 | Chou et al. | 358/488 |
| 6,903,848 B2 * | 6/2005 | Kirita | 358/474 |
| 6,982,815 B2 * | 1/2006 | Tsutsumi | 358/474 |
| 7,123,386 B2 * | 10/2006 | Tanaka et al. | 358/474 |
| 8,432,586 B2 | 4/2013 | Hamano et al. | |
| 2002/0018686 A1 | 2/2002 | Oshima et al. | |
| 2002/0131092 A1 | 9/2002 | Tanaka et al. | |
| 2008/0278774 A1 * | 11/2008 | Enami et al. | 358/475 |
| 2010/0128331 A1 | 5/2010 | Hamano et al. | |
| 2014/0002837 A1 * | 1/2014 | Miyamoto | 358/1.13 |
| 2014/0092453 A1 * | 4/2014 | Ishikawa | 358/498 |

FOREIGN PATENT DOCUMENTS

| | | |
|---|---|---|
| JP | S62-154950 A | 7/1987 |
| JP | H01-266529 A | 10/1989 |
| JP | H02-013359 U | 1/1990 |
| JP | H05-307293 A | 11/1993 |
| JP | H10-051598 A | 2/1998 |
| JP | H10-123804 A | 5/1998 |
| JP | H10-164312 A | 6/1998 |
| JP | 2000-266156 A | 9/2000 |
| JP | 2002-262024 A | 9/2002 |
| JP | 2006-086817 A | 3/2006 |

OTHER PUBLICATIONS

Chinese Office Action issued in CN 201310097292.0, mailed Apr. 17, 2015.

* cited by examiner

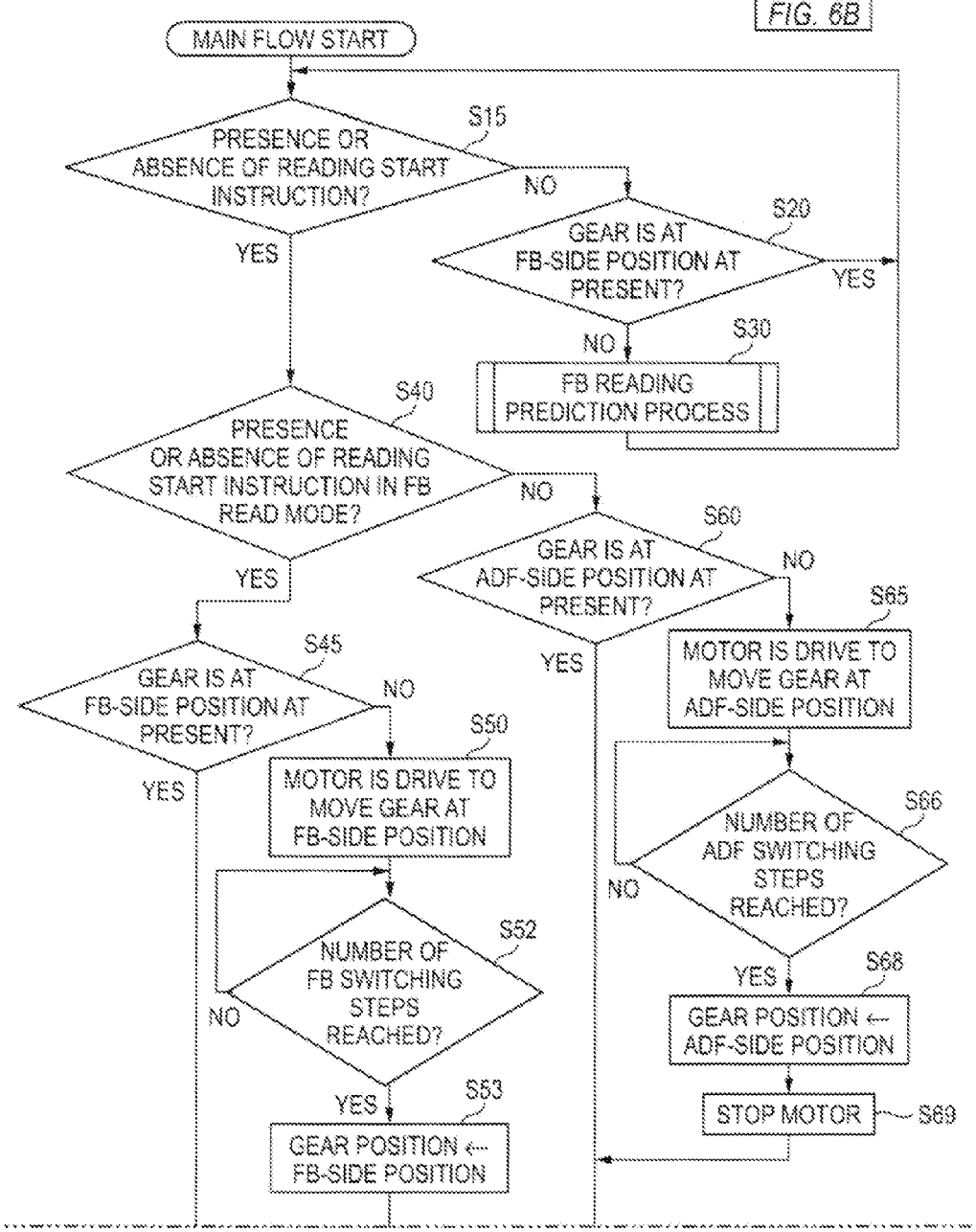

IMAGE READING DEVICE AND IMAGE FORMING APPARATUS

CROSS-REFERENCE TO RELATED APPLICATIONS

This application claims priority from Japanese Patent Application No. 2012-131179 filed on Jun. 8, 2012, the entire subject matter of which is incorporated herein by reference.

TECHNICAL FIELD

The present invention relates to an image reading device and an image forming apparatus, and more specifically, to an image reading device configured to drive a feeding device for feeding a sheet of document to a reading unit, such as CIS, and a moving device for moving the reading unit with a driving force of one motor.

BACKGROUND

There have been disclosed an image reading device capable of driving a feeding device (feeding unit) for feeding a sheet of document to a reading unit, such as CIS, and a carrying device (carriage) for carrying the reading unit with a driving force of one motor. According to the related-art image reading device, a position (feeding unit-side position) in which a transmitting unit (switching gear) transmits the driving force of the motor to the feeding device and a position (carriage-side position) in which the transmitting unit transmits the driving force to the carrying device are switched, so that the feeding device and the carrying device are driven by one motor.

SUMMARY

In the above-described related-art image reading device, however, in a case where the switching gear is not positioned at the carriage-side position at the time when a power is transmitted to the carriage and a reading start instruction to start reading document is input, a time to switch the switching gear to the carriage-side position is required, so that a reading time may become long.

Therefore, illustrative aspects of the present invention provide a technique for shortening a reading time in an image reading device configured to drive a feeding unit and a carriage by using a common motor.

According to one illustrative aspect of the invention, there is provided an image reading device comprising: a reading unit configured to read an image of a document; a feeding unit configured to feed the document; a carriage configured to hold and move the reading mil in a predetermined direction; a motor; a motor-side transmission gear configured to transmit a power supplied from the motor; a feeding unit-side transmission gear configured to transmit the power to the feeding unit; a carriage-side transmission gear configured to transmit the power to the carriage; a switching gear configured to be switched between a carriage-side position, in which the motor-side transmission gear and the carriage-side transmission gear are coupled, and a feeding unit-side position, in which the motor-side transmission gear and the feeding unit-side transmission gear are coupled; and a control unit. The control unit is configured to perform: a prediction process of predicting whether a carriage read mode, in which the carriage reads the image while being moved, will be executed before a receiving unit receives a reading start instruction of the image by the reading unit and a switching process of switching the switching gear to the carriage-side position in a case where the carriage read mode is predicted to be executed by the prediction process.

According to the above configuration, in the reading device configured to drive the feeding unit and the carriage with the common motor, if it is predicted that the carriage read mode is executed, the switching process of switching the switching gear to the carriage-side position is performed prior to receiving the reading start instruction. For this reason, the reading time can be shortened in the carriage read mode which moves the carriage and then reads the image.

Incidentally, the term "switching process" herein means that if the execution of the carriage read mode is predicted, the process of switching the switching gear to the carriage-side position is performed even a little. For this reason, the switching process includes the process of completely switching the switching gear to the carriage-side position, and an intermediate process of switching the switching gear to the carriage-side position, that is, the process of driving the switching gear from the feeding unit-side position in the direction close to the carriage-side position.

According to another illustrative aspect of the invention, the control unit is configured to further perform a determination process of determining whether the switching gear is at the carriage-side position. When it is determined in the determination process that the switching gear is not at the carriage-side position, the control unit is configured to perform the switching process.

According to the above configuration, it is possible to avoid a vain attempt to perform the switching process even when the switching mechanism is already at the carriage-side position.

According to still another illustrative aspect of the invention, in the determination process, the control unit is configured to determine whether the switching gear is at the carriage-side position on the basis of information about which read mode has been executed at a previous time among the carriage read mode and a feeding unit read mode, in which the document fed by the feeding unit is read.

According to the configuration, it is possible to easily perform the determination of the current position of the switching gear, without installing a dedicate sensor for detecting the position of the switching gear.

According to still another illustrative aspect of the invention, the image reading device further comprises: a reading table, on which the document is configured to be placed in the carriage read mode; a cover configured to cover the reading table, and a cover sensor configured to detect an opening and closing state of the cover. The control unit is configured to predict that the carriage read mode will be executed in a case where a detection result by the cover sensor is changed in the prediction process.

According to the above configuration, it is necessary to open and close the cover in order to execute the carriage read mode. For this reason, there is a high possibility that the carriage read mode is executed in a case where the cover is operated to be opened or covered. Therefore, by detecting change in detection result by the cover sensor, the execution of the carriage read mode can be reliably predicted.

According to still another illustrative aspect of the invention, the image reading device further comprises: a reading table, on which the document is configured to placed in the carriage read mode; and a detection member configured to be used for detecting a home position and provided between the reading table and a feeding unit reading position, in which the carriage is positioned in the feeding unit read mode to read the document fed by the feeding unit. In a case where the feeding unit read mode has been executed at the previous time and the carriage read mode is executed at a present time, the control unit is configured to perform a scanning moving process comprising: moving the carriage from the feeding unit reading position in a direction toward the home position by driving the motor in the same direction as the driving direction of the motor in the switching process and controlling the reading unit to read the detection member so as to detect the home position; and controlling the reading unit to start reading and scanning of the document when a driving amount of driving the motor reaches a predetermined driving amount after detecting the home position by the reading unit. The driving amount of the motor in the switching process is less than a sum of a first driving amount for moving the switching gear from the feeding unit-side position to the carriage-side position, and a second driving amount for moving the carriage from the feeding unit read position to the home position.

According to the above configuration, the carriage after switching process is not positioned toward the document reading and scanning side beyond the home position. For this reason, if the motor is controlled in the same direction as the motor control direction in the switching process, it is possible to reliably detect the home position. And, when the motor is continuously driven in the same direction, the document can be read and scanned. As a result, the reading time according to the exemplary embodiment can be shortened, as compared with a case where the carriage after the switching process is positioned at a home position side than the reading and scanning position side.

According to still another illustrative aspect of the invention, in a case where the cover sensor does not detect the document in the prediction process, the control unit is configured to predict that the carriage read mode will be executed when the receiving unit receives a selection of a function related to the carriage read mode.

According to still another illustrative aspect of the invention, the switching gear comprises a planetary gear mechanism comprising: a transmission gear configured to be meshed with the motor-side transmission gear; a sun gear configured to rotate together with the transmission gear, wherein the transmission gear and the sun gear are configured to rotate around the same shaft; and a planetary gear configured to be meshed with the sun gear and to turn and revolve around the sun gear in accordance with a rotation of the sun gear. A position of the planetary gear is configured to be switched between the carriage-side position where the planetary gear is meshed with the motor-side transmission gear and the carriage-side transmission gear so as to transmit the power from the motor to the carriage and the feeding unit-side position where the planetary gear is meshed with the motor-side transmission gear and the feeding unit-side transmission gear so as to transmit the power from the motor to the feeding unit.

According to still another illustrative aspect of the invention, there is provided an image forming apparatus comprising: the image reading device according to the above illustrative aspects; and an image forming unit configured to form an image on a recording medium on the basis of image data of the image read by the image reading device.

According to the above configuration, in the image forming apparatus including the image reading device, since the reading time can be shorten in the feeding unit read mode to read the document to be fed by the feeding unit, it is possible to shorten a time from the receiving of the read start instruction to the forming of the image on the medium to be recorded.

According to the illustrative aspects of the present invention, before the receiving unit receives the reading start instruction, if it is predicted that the carriage read mode in which the carriage is moved to read the image will be executed, the switching process of switching the switching gear to the carriage-side position is performed. For this reason, the reading time can be shortened in the image reading device capable of driving the feeding unit and the carriage with the common motor.

BRIEF DESCRIPTION OF THE DRAWINGS

FIGS. 6A and 6B are flowcharts illustrating a document reading process in document reading;

DETAILED DESCRIPTION

Exemplary embodiments of the invention will now be described with reference to the drawings.

1. External Configuration of Multi-Function Device

Figure 1:
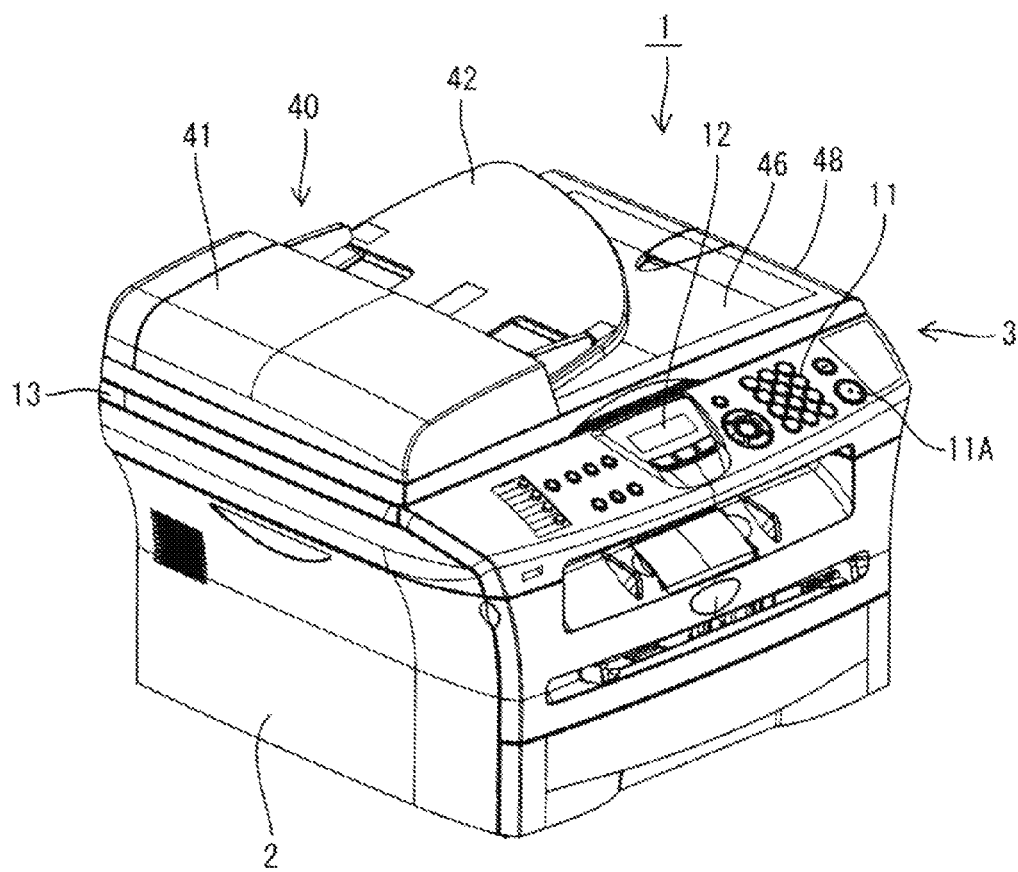
FIG. 1 is a perspective view illustrating an appearance of a multi-function device according to an exemplary embodiment.

A multi-function device 1 illustrated in FIG. 1 is a multi-function peripheral including a printer function, a scanner (document reading) function, a copying function, a facsimile function, and so forth, and is one example of an image forming apparatus.

Figure 2:
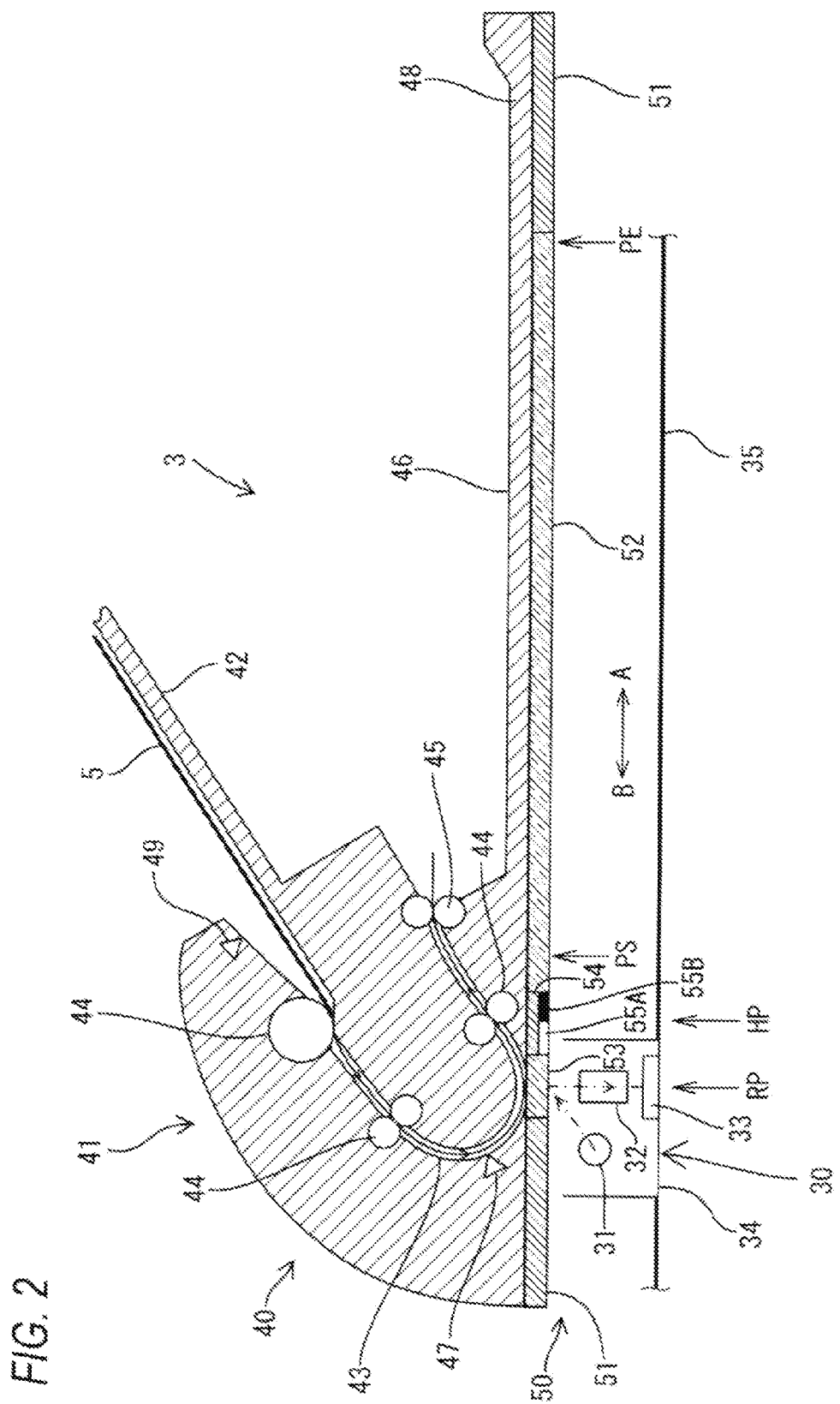
FIG. 2 is a schematic cross-sectional view of an image reading device of the multi-function device.

The multi-function device 1 includes an image reading device 3 configured to read a sheet of document on a body unit 2, as illustrated in FIG. 1. The image reading device 3 includes, as illustrated in FIG. 2, a reading unit, a carriage 34, an automatic document feeder (ADF) device 40, a document placing unit 50, and a read drive unit 60 (see FIG. 5). The image reading device 3 includes a carriage read mode (hereinafter, referred to as an FB (flat bed) read mode) to read an image by moving the carriage 34, and a feeding unit read mode (hereinafter, referred to as an ADF read mode) to read the document fed by a feeding unit 44 and 45 (see FIG. 2), as an image read mode. Incidentally, the image reading device is not limited to a part of the multi-function device 1. For example, the image reading device may be a primary scanner device or copying machine.

The document placing unit 50 includes, as illustrated in FIG. 2, a frame 51, a first platen glass 52 (one example of the reading table) made of a transparent glass, a second platen glass 53, and an intermediate frame 54 disposed between the glasses 52 and 53. An upper surface of the first platen glass 52 is covered by a pivotable document cover 48.

The intermediate frame 54 is provided with a mark 55 for detecting a home position HP, and the mark 55 is constituted by a white tape 55A and a black tape 55B which are arranged in a direction of the arrow A in FIG. 2. A position in which the data react by a read unit 30 is changed from a black color to a white color (otherwise, from the white color to the black color) is detected as the home position HP. Herein, the home position HP may be a standby position in which the read unit 30 stands by when the read unit 30 does not execute the image reading process of reading the image of the document 5, and may be a reference position of a moving control of the carriage 34 when the FB reading operation is carried out.

That is, when a drive amount (the number of drive steps in this exemplary embodiment) of driving a motor 62 reaches a predetermined drive amount after the home position HP is detected by the reading unit 30, reading and scanning of the document 5 by the reading unit 30 starts. In other words, when the motor 62 is driven by the predetermined number Sst of FB reading start steps and then the reading unit 30 reaches a reading start position PS illustrated in FIG. 2 from the home position HP, the reading unit 30 starts the reading and scanning of the document 5. Further, when the motor 62 is driven by the predetermined number Sen of FB reading end steps and then the reading unit 30 reaches a reading end position PE illustrated in FIG. 2 from the home position HP, the reading unit 30 ends the reading and scanning of the document 5. In this way, the home position HP becomes the reference position when the reading unit 30 performs the reading and scanning.

The document cover 48 is connected to a rear-side upper portion (a side on which an operation unit 11 and a display unit 12 are provided is referred to as a front side) of the body unit 2 of the multi-function device 1 such that the document cover 48 is able to be pivoted between a closing posture to cover the first platen glass 52 and an opening posture to open the first plates glass 52. The ADF device 40 is installed on the document cover 48. The body unit 2 is provided on its upper portion with a cover sensor 13 configured to detect the open and closed state of the document cover 48 (see FIG. 1).

The ADF device 40 includes, as illustrated in FIG. 2, an ADF cover 41, a document tray 42, a feeding path 43, various rollers, such as a feeding roller 44 and a sheet discharge roller 45, and a sheet discharge tray 46 using the upper surface of the document cover 48. The ADF device 40 is configured to feed sheets of document 5 placed (set) on the document tray 42 one at a time, and to convey the sheet over the second platen glass 53 to the sheet discharge tray 46. In addition, the ADF device 40 includes a document feeding sensor 47, such as a photo sensor, configured to detect the document 5 fed by the feeding roller 44, and a document set sensor (one example of the document sensor), such as a photo sensor, configured to detect the document 5 set on the document tray 42. Herein, the feeding roller 44 and the sheet discharge roller 45 correspond to the feeding unit configured to feed the document 5. The document 5 is set on the document tray 42 at the position to which the paper is fed at the drive start of the feeding unit.

The reading unit 30 is installed below the document placing unit 50, as illustrated in FIG. 2. The reading unit 30 is configured to read the document in a CIS (contact image sensor) manner. The reading unit 30 includes a linear image sensor 33 having a plurality of light receiving elements linearly arranged in a direction vertical to a sheet surface, a light source 31 configured by light emitting diodes of three RGB, and a rod lens array 32 configured to focus the reflective light reflected from the document 5 or the like on the respective light receiving elements of the linear image sensor 33. The carriage 34 configured to hold the reading unit 30 is connected to a timing belt 35. The carriage 34 is configured to be moved in a direction of arrow A or arrow B in accordance with the movement of the timing belt 35. The timing belt 35 is driven by the read drive unit 60, which will be described later, via a sprocket (not illustrated) or the like. Incidentally, the reading unit 30 is not limited to the CIS manner, and may be a so-called CCD manner employing a reduction optical system and a CCD (charged coupled device) image sensor.

When the reading unit 30 reads the document 5 set on the first platen glass 12, that is, when the FB read mode is executed, the reading unit 30 reads the document 5 while being carried from the home position HP toward a direction parallel with a board of the first platen glass 52 at a constant speed by the carriage 34 that is connected to the timing belt 35. Incidentally, the reading range in the carrying direction is, for example, from the reading start position PS to the reading end position PE illustrated in FIG. 2.

On the other hand, when the reading unit 30 reads the document 5 fed by the ADF device 40, that is, when the ADF read mode is executed, the reading unit 30 is held by the carriage 34 at the ADF reading position (one example of the feeding unit reading position) RF directly under the second platen glass 53 to read the document 5.

The front side of the multi-function device 1 is provided with the operation unit 11 having various buttons, and, for example, the display unit 12 constituted by a liquid crystal display, as illustrated in FIG. 1. The operation unit 11 has a start button 11A for starting the reading operation.

Incidentally, in this exemplary embodiment, the position of the carriage 34 or the position of the reading unit 30 means a position of the linear image sensor 33 of the reading unit 30. For example, if the carriage 34 and the reading unit 30 are positioned at the ADF reading position RP, as illustrated in FIG. 2, it means that the linear image sensor 33 is positioned at a position opposite to the second platen glass 53. Further, if the carriage 34 and the reading unit 30 are positioned at the home position HP, it means that the linear image sensor 33 is positioned at a position opposite to the intermediate frame 54, that is, a position opposite to the mark for detecting the home position HP.

2. Configuration of Read Drive Unit

Next, the read drive unit 60 will be described with reference to FIGS. 3 to 5. The read drive unit 60 includes a motor drive unit 61, the motor 62, and a gear unit 70.

The motor (electric motor) 62 is a stepping motor, and the motor drive unit 61 is configured to generate a drive signal to step-drive the motor 62. The gear unit 70 includes a motor-side transmission gear 71, a feeding unit-side transmission gear 73, and a planetary gear mechanism 74. The planetary gear mechanism 74 is configured by a transmission gear 74A, a sun gear 74B, and a planetary gear (one example of the switching gear) 74C.

The motor-side transmission gear 71 is coupled with a rotation shaft of the motor 62, and is meshed with the transmission gear 74A of the planetary gear mechanism 74. Therefore, in accordance with the rotation of the motor 62, the motor-side transmission gear 71 transmits the power supplied from the motor 62 to the transmission gear 74A. The sun gear 74B and the transmission gear 74A are fixed on the same shaft, and the sun gear 74B is rotated in accordance with the rotation of the transmission gear 74A, that is, the rotation of the motor-side transmission gear 71.

The planetary gear 74C is meshed with the sun gear 74B and is configured to turn and revolve around the sun gear in accordance with the rotation of the sun gear 74B. The position of the planetary gear 74C is switched between a carriage-side position (hereinafter, referred to as an FB-side position), in which the planetary gear 74C is meshed with the carriage-side transmission gear 72 and the motor-side transmission gear 71 is meshed with the carriage-side transmission gear 72 via the transmission gear 74A and the sun gear 74B, and a feeding unit-side position (hereinafter, referred to as an ADF-side position), in which the planetary gear 74C is meshed with the feeding unit-side transmission gear 73 and the motor-side transmission gear 71 is meshed with the feeding unit-side transmission gear 73 via the transmission gear 74A and the sun gear 74B. FIG. 3 illustrates a case where the planetary gear 74C is positioned at the FB-side position, and FIG. 4 illustrates a case where the planetary gear 74C is positioned at an ADF-side position.

Incidentally, when the read is performed at each position, the revolution of the planetary gear 74C is prevented by a predetermined rotation prevention mechanism (not illustrated), and thus turns in accordance with the rotation of the sun gear 74B in the state in which the planetary gear 74C is held at each position. Further, when the position of the planetary gear 74C is switched, the planetary gear 74C revolves is accordance with the rotation of the sun gear 74B in the state in which the prevention of revolution by the rotation prevention mechanism is released.

Figure 3:
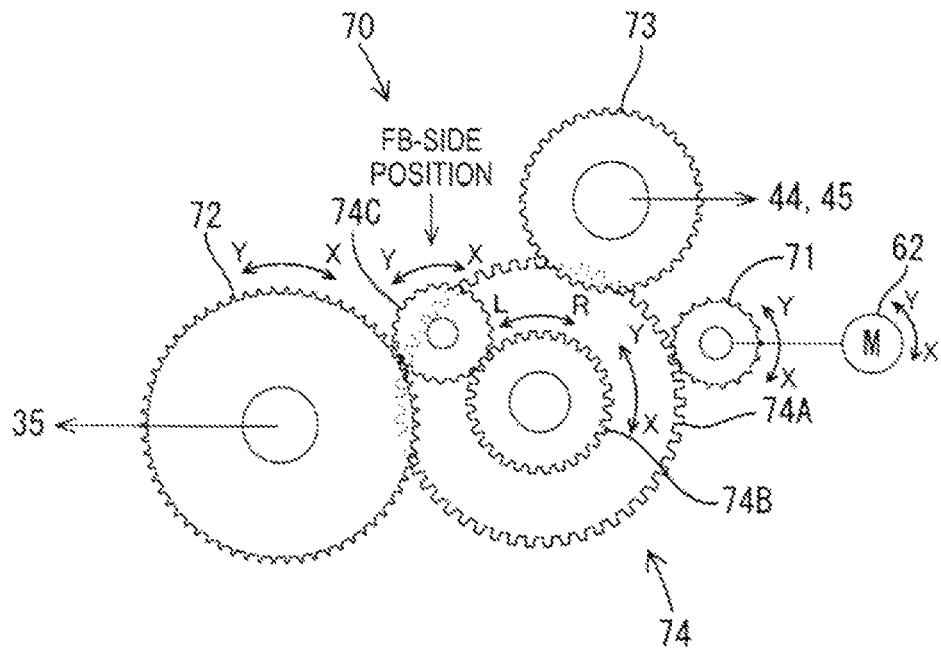
FIG. 3 is a diagram illustrating a case where a planetary gear is positioned at an FB-side position.

The carriage-side transmission gear 72 is configured to transmit the power from the motor 62 to the carriage 34 via the timing belt 35 when the planetary gear 74C is at the FB-side position, that is, when the FB read mode is executed, as illustrated in FIG. 3. In this way, the carriage 34 is moved.

Figure 4:
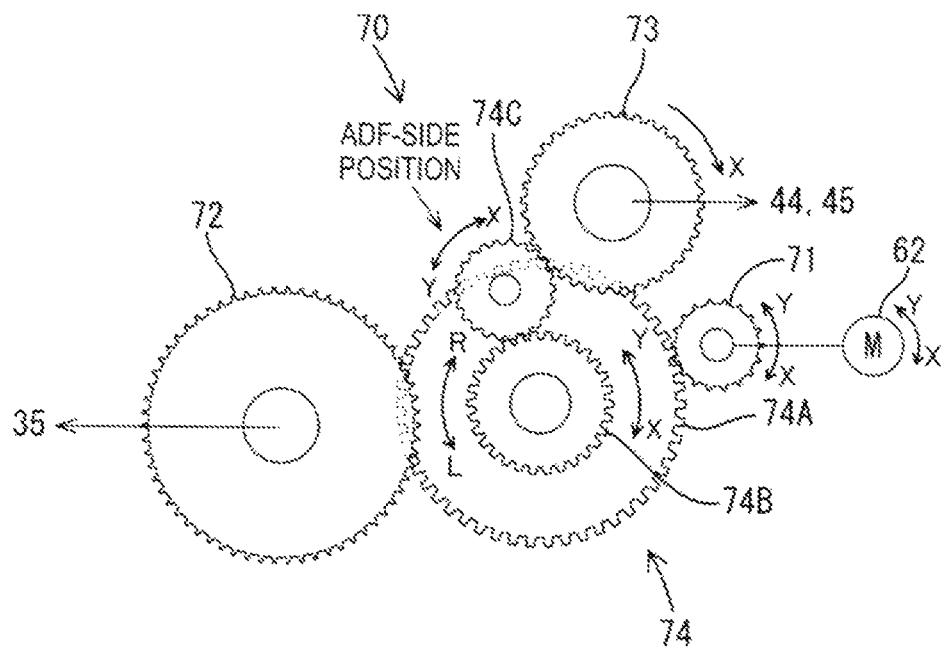
FIG. 4 is a diagram illustrating a case where the planetary gear is positioned at an ADF-side position.

The feeding unit-side transmission gear 73 is configured to transmit the power from the motor 62 to the feeding roller 44 and the sheet discharge roller 45 via a predetermined gear mechanism (not illustrated) when the planetary gear 74C is at the ADF-side position, that is, when the ADF read mode executed, as illustrated in FIG. 4. In this way, the document 5 is fed.

The operation of the read drive unit 60 will now be described in detail. In FIGS. 3 and 4, a rotational direction of direction X is referred to as a clockwise rotational direction, and a rotational direction of direction Y is referred to as a counterclockwise rotational direction. For example, the rotation of the motor 62 in the direction X is referred to as a forward rotation, and the rotation of the direction Y is referred to as a reverse rotation. Further, the motor-side transmission gear 71 is rotated in the direction X in accordance with the rotation of the motor 62 in the direction X, and is rotated in the direction Y in accordance with the rotation of the motor 62 in the direction Y.

2-1. Rotation of Motor and Rotation of Each Gear

For example, at a position in which the planetary gear 74C is not meshed the carriage-side transmission gear 72 and the feeding unit-side transmission gear 73, when the motor 62 is rotated forwardly (direction X), the motor-side transmission gear 71 is rotated in the direction X, and thus the transmission gear 74A and the sun gear 74B are rotated in the direction Y. As the sun gear 74B is rotated in the direction Y, the planetary gear 74C turns in the direction X and also revolves in a direction L. As illustrated in FIG. 3, when the planetary gear 74C is meshed with the carriage-side transmission gear 72 and then is positioned at the FB-side position, the planetary gear 74C turns in the direction X, but the revolution of the planetary gear 74C in the direction L is prevented by the carriage-side transmission gear 72. In this instance, the carriage-side transmission gear 72 is rotated in the direction Y, and the timing belt 35 is moved to move the carriage 34 in the direction A in FIG. 2, that is, in a direction of moving the carriage 34 from the reading start position PS to the reading end position PE.

On the other hand, as the motor 62 is rotated reversely (direction Y) when the carriage 34 is positioned other than the ADF reading position RP, the motor-side transmission gear 71 is rotated in the direction Y, and thus the transmission gear 74A and the sun gear 74B are rotated in the direction X. In accordance with rotation of the sun gear 74B in the direction X, the planetary gear 74C turns in the direction Y, but the revolution of the direction R is prevented by the prevention mechanism. In this instance, the carriage-side transmission gear 72 is rotated in the direction X, and thus the timing belt 35 is moved to move the carriage 34 from the direction B in FIG. 2, that is, in a direction of moving the carriage 34 from the reading end position PE to the reading star position PS.

When the carriage 34 moved in the direction B in FIG. 2 reaches the ADF reading position RP, prevention of the planetary gear 74C from revolving in the direction R by the prevention mechanism is released, and thus the planetary gear 74C turns in the direction Y and also revolves in the direction R. As illustrated in FIG. 4, when the planetary gear 74C is meshed with the feeding unit-side transmission gear 73 and is positioned at the ADF-side position, the planetary gear 74C turns in the direction Y, but the revolution of the planetary gear 74C in the direction R is prevented by the feeding unit-side transmission gear 73. In this instance, the transmission gear 73 is rotated in the direction X in accordance with turning of the planetary gear 74C in the direction Y. As the feeding unit-side transmission gear 73 is rotated in the direction X, the feeding rosier 55 and the sheet discharge roller 45 are rotated.

On the other hand, as the motor 62 is rotated forwardly (direction X), the motor-side transmission gear 71 is rotated in the direction X, and thus the transmission gear 74A and the sun gear 74B are rotated in the direction Y. As the sun gear 74B is rotated in the direction Y, prevention of the planetary gear 74C from revolving in the direction R is released, and thus the planetary gear 74C turns in the direction X and also revolves in the direction L.

2-2. Operation of Each Gear in ADF Read Mode

In the ADF read mode, in the case where the motor 62 is rotated in the direction Y (counterclockwise direction) so that the planetary gear 74C turns in the direction Y and thus revolves in the direction R to be meshed with the feeding unit-side transmission gear 73, when the motor 62 is continuously rotated in the direction Y after the planetary gear 74C is meshed with the feeding unit-side transmission gear 73, the feeding roller 44 and the sheet discharge roller 45 are rotated in a direction to feed the document 5 from the document tray 42 to the sheet discharge tray 46.

In the case where the motor 62 is rotated in the direction X after the planetary gear 74C is meshed with the feeding unit-side transmission gear 73, the planetary gear 74C revolves in the direction L which is apart from the feeding unit-side transmission gear 73 having been meshed therewith. Incidentally, the feeding unit-side transmission gear 73 is rotated only in the direction X.

2-3. Operation of Each Gear in FB Read Mode

In the FB read mode, in the case where the motor 62 is rotated in the direction X so that the planetary gear 74C turns in the direction X and also revolves in the direction L to be meshed with the carriage-side transmission gear 72, when the motor 62 is continuously rotated in the direction X after the planetary gear 74C is meshed with the carriage-side transmission gear 72, the carriage-side transmission gear 72 is driven in the direction Y so that the timing belt 35 moves the carriage 34 in the direction A in FIG. 2.

In the case where the motor 62 is rotated reversely from the direction X in the direction Y after the planetary gear 74C is meshed with the carriage-side transmission gear 72, the planetary gear 74C turns in a direction (direction Y) reverse to the direction X. However, by the prevention mechanism for preventing the planetary gear 74C from revolving in the direction R which is apart from the carriage-side transmission gear 72 having been meshed therewith, the planetary gear 74C does not revolve in the direction R, but turn in the direction X. In this instance, the carriage-side transmission gear 72 is rotated reversely in the direction X, and thus the timing belt 35 is moved in a direction to move the carriage 34 in the direction B in FIG. 2.

When the timing belt 35 is driven to move the carriage 34 in the direction B in FIG. 2 and thus the carriage 34 reaches a position where the carriage 34 does not move physically, that is, the ADF reading position RP, prevention of the planetary gear 74C from revolving by the prevention mechanism is released, and the operation of each gear in the ADF read mode starts.

Incidentally, the prevention mechanism can be configured by, for example, a lever pivotally supporting the planetary gear 74C, a groove cam for restricting rotation of the lever, and a spring for holding the state of the transmission gear 73.

3. Electrical Configuration of Multi-Function Device

Figure 5:
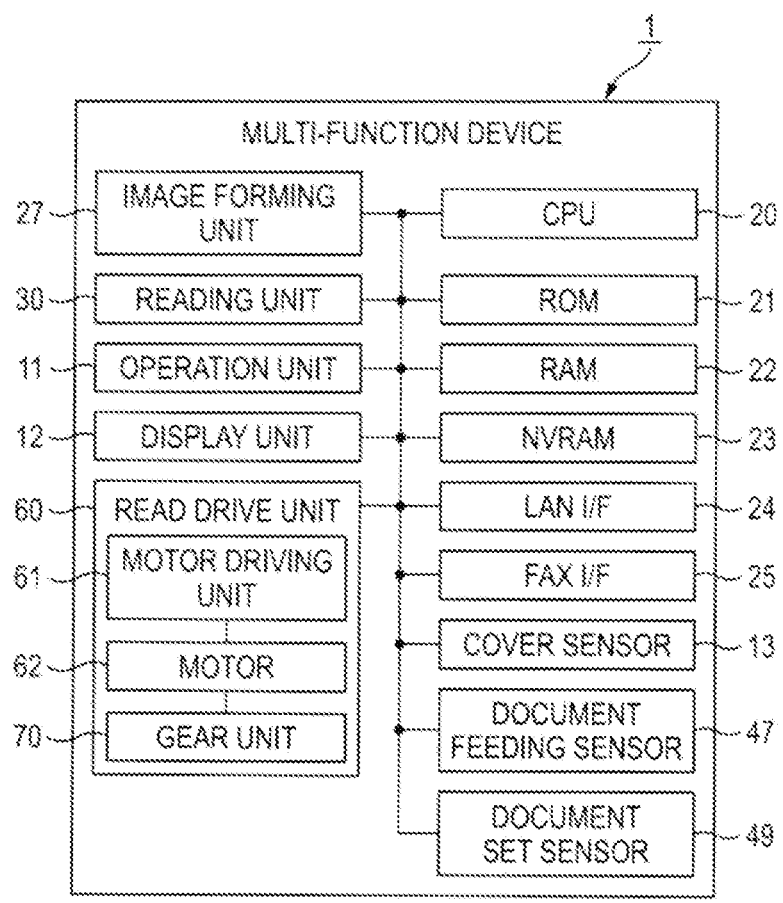
FIG. 5 is a block diagram schematically illustrating an electrical configuration of the multi-function device.

The multi-function device 1 includes, as illustrated in FIG. 5, a CPU 20 (one example of a control unit), a ROM 21, a RAM 22, an NVRAM (non-volatile memory) 23, a network interface (one example of a receiving unit) 24 and a facsimile interface 25. The image forming unit 27, the reading unit 30, the operation unit (one example of the receiving unit) 11, the display unit 12, a cover sensor 13, the document feeding sensor 47, the document set sensor 49 and the read drive unit 60 are connected thereto.

The ROM 21 stores various programs to control the operation of the multi-function device 1. The CPU 20 is configured to make the RAM 22 or the NVRAM 23 store the processed result in accordance with the program read from the ROM 21 to control each unit.

The network interlace 24 is connected to an external computer or the like via a communication line (not illustrated), and the multi-function device 1 is configured to perform data communication via the network interface 24. Incidentally, a read start instruction may be also received from an external computer via the network interface 24.

The facsimile interface 25 is connected to a telephone line (not illustrated), and the multi-function device 1 is configured to perform communication of facsimile data with external facsimile device via the facsimile interlace 25. The image forming unit 27 includes a charging unit, a photosensitive unit, a photoreceptor, a developing unit, a transfer unit, and a fixing unit which are known in the art, and is configured to form an image on a sheet (one example of a recording medium) based on the image data of the image (document) read by the image reading device 3.

The CPU 20 is configured to control various processes for the multi-function device 1. As the process for the image reading device 3, the CPU 20 is configured to perform a prediction process of predicting whether the carriage read mode (FB read mode) to read the image by moving the carriage 34 will be executed before receiving the reading start instruction from the operation unit 11 or the network interface 24, and a switching process of switching the planetary gear 74C to the FB-side position (carriage-side position) if the FB read mode is executed in the prediction process.

4. Document Reading Process

Next, the document reading process according to this exemplary embodiment will be described with reference to FIGS. 6 to 9. The document reading process is performed by turning on the power source of the multi-function device 1 by the power button 11B. Each process for the document reading process is performed by the CPU 20 in accordance with a predetermined control program stored in the ROM 21 or the like. Incidentally, in this exemplary embodiment, the planetary gear 74C is held at the position corresponding to the read mode which has been executed at a previous time. In this instance, the carriage 34 and the reading unit 30 are positioned at the home position HP when the previous time is the RP read mode, and are positioned at the ADF reading position RP when the previous time is the ADF read mode.

Figure 6B:
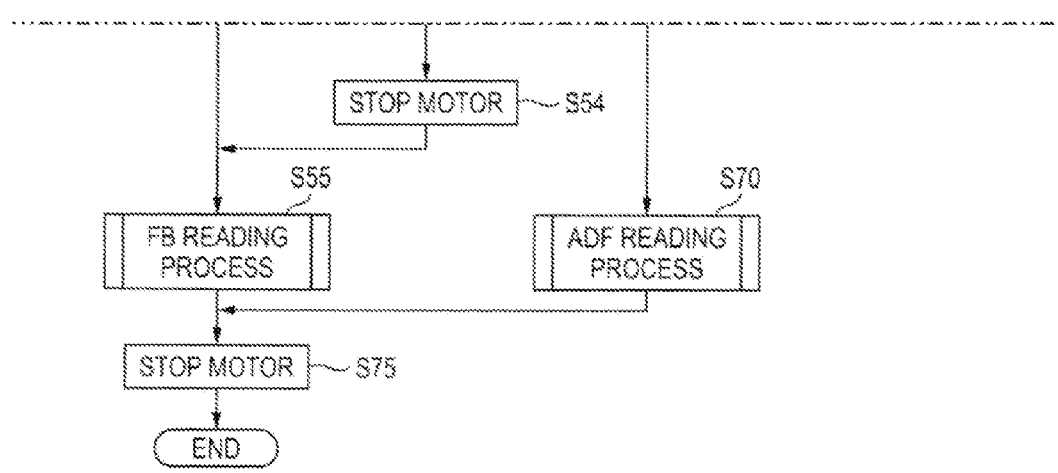

In the document reading process, as illustrated in FIG. 6, the CPU 20 first determines whether there is the reading start instruction to start the reading operation (step S15). That is, the CPU 20 determines whether the document reading function is selected and the start button 11A is pushed on the basis of presence or absence of a signal from the start button 11A, or the CPU 20 determines whether the reading start instruction is selected from the external computer or the like on the basis of the presence or absence of a command indicating the reading start instruction from the network interlace 24. If it is determined that the reading start instruction is issued (YES in step S15), the CPU 20 determines whether the reading start instruction is a reading start instruction of the FB read mode (step S40).

On the other hand, if it is determined that there is no reading start instruction (NO in step S15), the CPU 20 determines whether or not the planetary gear 74C is positioned at the FB-side position at present (step S20). This determination is performed with reference to, for example, a read mode flag MFg. The read mode flag MFg is a flag indicating the executed read mode, and, for example, becomes 1 if the executed read mode is in the FB read mode, or becomes 0 if the executed read mode is in the ADF read mode. That is, the CPU 20 determines whether or not the planetary gear 74C is at the FB-side position (carriage-side position), on the basis of the information about that the read mode executed at the previous time is any one of the FB read mode and the ADF read mode. In this way, by referring the read mode flag MFg, it is possible to easily perform the determination of the current position of the planetary gear 74C, without installing a dedicate sensor.

If it is determined that the planetary gear 74C is not at the FB-side position (NO in step S20), the CPU performs the FB reading process (step S30) which will be described later, and it returns to the process of step S15. On the other hand, if it is determined that the planetary gear 74C is at the FB-side position (YES in step S20), it returns to the process of step S15.

Figure 7:
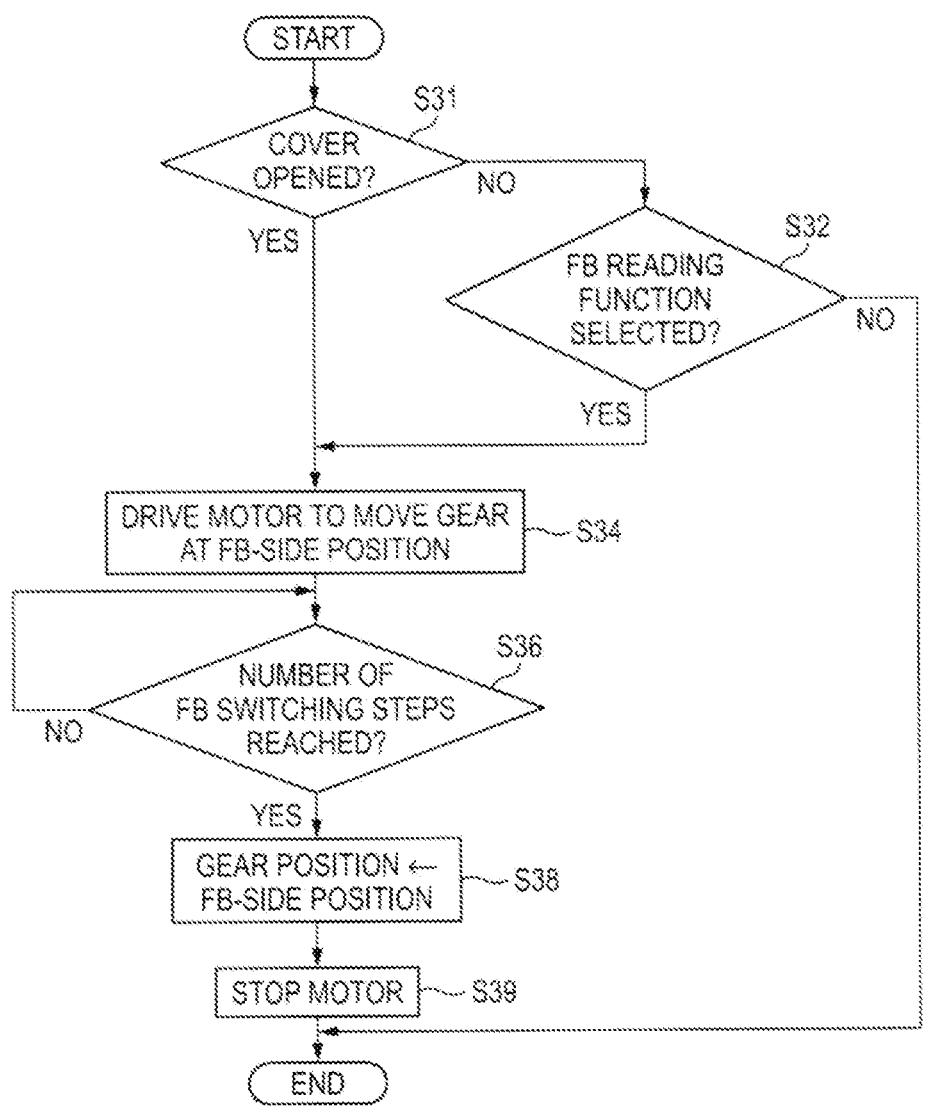
FIG. 7 is a flowchart illustrating an ADF reading prediction process at the document reading process.

In the FB reading process (step S30), as illustrated in FIG. 7, the CPU 20 determines whether the document cover 48 is opened or not based on the detected signal from the cover sensor 13, in other words, whether the detection result by the cover sensor 13 is changed (step S31).

If it is determined that the document cover 48 is not opened (NO in step S31), the CPU 20 determines whether the FB reading function, that is, the function for the FB read mode is selected (set) by the operation unit 11 (step S32). As the function for the FB read mode, for example, there is an auto-crop function.

If it is determined that the FB reading function is not selected (NO in step S32), it is regarded that the execution of the FB read mode is not predicted, and thus the FB reading prediction process is terminated. On the other hand, if it is determined that the document cover 48 is opened (YES in step S31) or if it is determined that the FB reading function is selected (YES in step S32), the motor 62 is driven to revolve the planetary gear 74C toward the FB-side position (step S34).

The reason is that the execution of the FB read mode is predicted if the document cover 48 is opened or if the FB reading function is selected. That is, it is necessary to operate the document cover 48 to be opened or closed in order to execute the FB mode. For this reason, if the document cover 48 is operated to be opened or closed, there is a high possibility that the FB read mode will be executed. That is, the reason is that as the detection result by the cover sensor 13 is changed, the execution of the FB read mode can be reliably predicted. Also, the reason is that if the function specific to the FB read mode is selected, the high possibility is that the FB read mode is executed.

Then, the CPU determines whether the number Sdz of steps after driving the motor 62 reaches the number Sfb of FB switching steps (step S36). The number Sfb of FB switching steps is, for example, less than the steps (Sa+Sb) obtained by adding the number Sb (one example of the second driving amount) of steps for moving the carriage 34 from the reading position RP to the home position HP to the number Sa (one example of the first driving amount) of steps for moving the planetary gear 74C from the ADF-side position to the FB-side position. That is, Sfb<Sa+Sb. Incidentally, the number Sfb of FB switching steps is one example of the driving amount of the motor in the switching process.

While it is determined that the number Sdz of steps after driving the motor 62 does not reach the number Sfb of FB switching steps (NO in step S36), there is a possibility that the planetary gear 74C is not at the FB-side position and is not at the ADF-side position, that is, is at the intermediate position therebetween. Thus, the determining process of step S36 is repeated until it is determined that the number Sdz of steps after driving the motor 62 reaches the number Sfb of FB switching steps. On the other hand, if it is determined that the number Sdz of steps after driving the motor 62 reaches the number Sfb of FB switching steps (YES in step S36), it is regarded that the planetary gear 74C is at the FB-side position. Therefore, the information of the read mode flag MFg which is 1 is recorded in the NVRAM 23 (step S38), and the driving of the motor 62 is stopped (step S39).

In the FB reading prediction process, if it is determined that the execution of the FB read mode is predicted, the planetary gear 74C is switched to the FB-side position before the reading start instruction is received. For this reason, in the case where the feeding units 44 and 45 and the carriage 34 are driven by one motor 62, the reading time can be shortened in the FB read mode. Incidentally, although the process of steps S31 and S32 in FIG. 7 are performed in this exemplary embodiment, any one of the processes may be performed.

If it is determining that the number Sdz of steps after driving the motor 62 reaches the number Sfb of FB switching steps, the driving of the motor 62 is stopped, so that the carriage 34 is not positioned toward the direction A side illustrated in FIG. 2 beyond the home position HP after the planetary gear 74C is switched to the FB-side position. For this reason, if the motor is driven to move the carriage 34 in the direction A in FIG. 2, it is possible to certainly detect the home position HP. Then, when the motor 62 is continuously driven in the direction A, the document 5 can be scanned. Therefore, the reading time can be shortened, as compared with the case where the carriage 34 is positioned at the direction A side rather than the home position HP after the switching process.

That is, as described above, the home position HP becomes the reference position of the motor driving when the document is read. For this reason, if the carriage 34 is positioned at the direction A side rather than the home position HP, when the reading of the document 5 is started, it is necessary for the motor 62 to be first driven to move the carriage 34 in the direction B side so as to return the carriage 34 to the home position HP and then the driving direction thereof is switched to move the carriage 34 in the direction A side. However, according to this exemplary embodiment, since it is not necessary to switch the driving direction of the motor 62, the reading time can be shortened.

Next returning to step S40 in FIG. 6, if it is determined that the reading start instruction is the reading start instruction in the FB read mode (YES in step S40), it is determined whether the planetary gear 74C is at the FB-side position at present (step S45). For example, if the document set sensor 49 does not detect the document 5 when receiving the reading start instruction, it is determined that the reading start instruction is the reading start instruction in the FB read mode.

If the planetary gear 74C is at the FB-side position at present (YES in step S45), the process of executing the FB read mode which will be described later is performed (step S55). On the other hand, if it is determined that the planetary gear 74C is not at the FB-side position at present (NO in step S45), the motor 62 is driven in the direction such that the planetary gear 74C revolves toward the FB-side position (step S50).

Then, it is determined whether the number Sdz of steps after driving the motor 62 reaches the number Sfb of FB switching steps (step S52), similar to step S36. While it is determined that the number Sdz of steps after driving the motor 62 does not reach the number Sfb of FB switching steps (NO in step S52), there is the possibility that the planetary gear 74C is trot at the FB-side position and also is not at the ADF-side position, that is, is at the intermediate position therebetween. Thus, the determining process of step S52 is repeated until the number Sdz of steps after driving the motor 62 reaches the number Sfb of FB switching steps. On the other hand, if it is determined that the number Sdz of steps after driving the motor 62 reaches the number Sfb of FB switching steps (YES in step S52), it is regarded that the planetary gear 74C is at the FB-side position. Therefore, the information of the read mode flag MFg which is 1 is recorded in the NVRAM 23 (step S53), the driving of the motor 62 is stopped (step S54), and the process of executing the FB read mode is performed (step S55).

Figure 8:
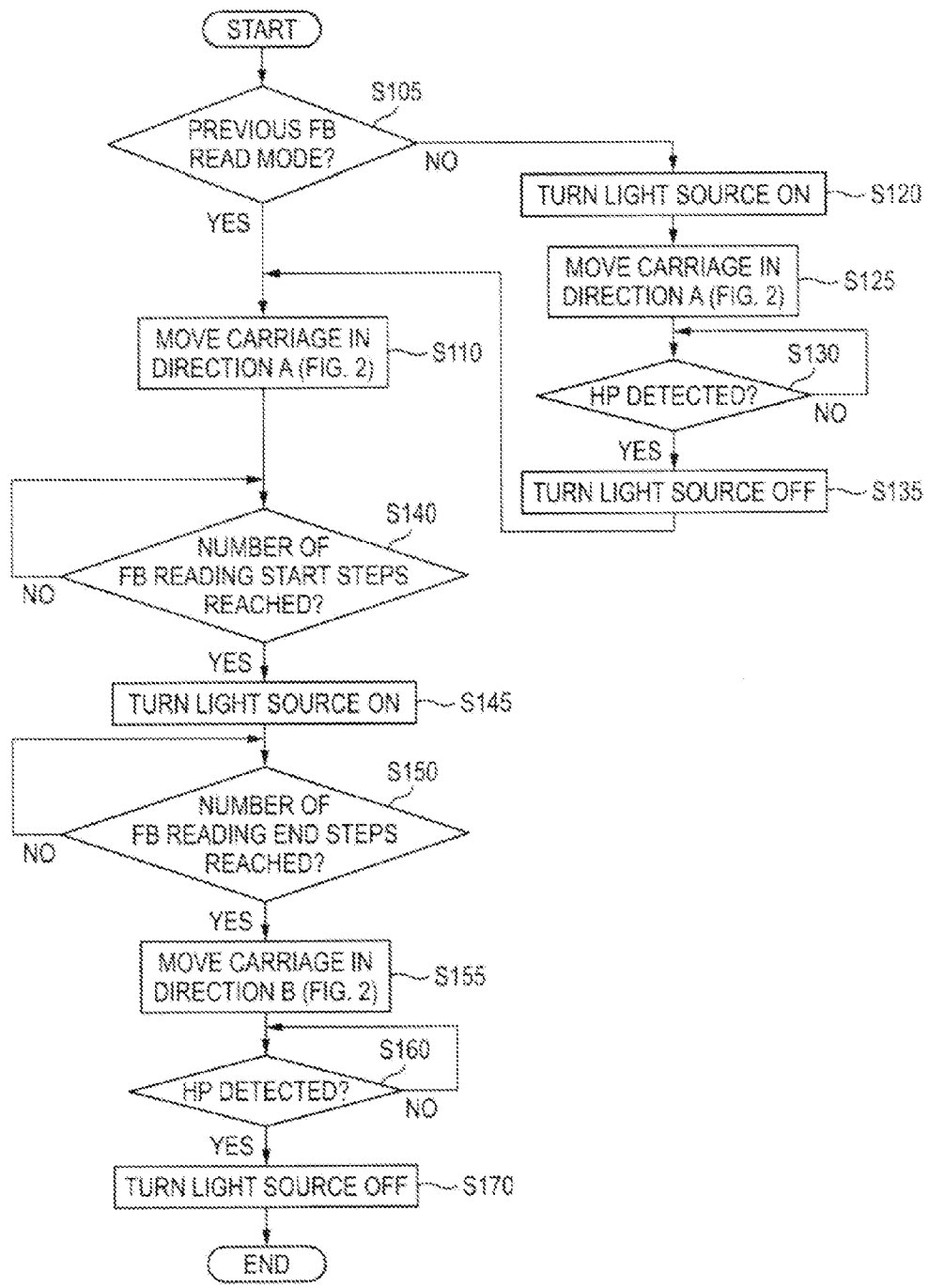
FIG. 8 is a flowchart illustrating an FB read mode executing process.

In the process of executing the FB read mode, as illustrated in FIG. 8, the CPU 20 first determines whether the reading process of the previous time has been performed in the FB read mode (step S105). If it is determined that the read mode of the previous time is the FB read mode (YES in step S105), the CPU 20 drives the motor 62 to move the carriage 34 from the home position HP in the direction A illustrated in FIG. 2 (step S110). On the other hand, if it is determined that the read mode of the previous time is not the FB read mode, that is, the read mode of the previous time is the ADF read mode (NO in step S105), the CPU 20 turns on the light source 31 (step S120) and drives the motor 62 to move the carriage 34 from the stop position by the stopping process of the motor 62 in step S39 or step 54 toward the direction A illustrated in FIG. 2 (step S125).

Then, the CPU 20 determines whether the home position HP is detected by the moving of the carriage 34 (step S130). If it is determined that the reading unit 30 detects a boundary between the white tape 55A and the black tape 55B by the moving of the carriage 34 (YES In step S130), the CPU 20 turns off the light source 31 (step S135) and moves the carriage 34 from the home position HP toward the direction A illustrated in FIG. 2 (step S110).

Then, the CPU 20 determines whether the number Sdh of steps of driving the motor 62 to move the carriage 34 positioned at the home position HP in the direction A illustrated in FIG. 2 reaches the predetermined number Sst of FB reading start steps (one example of predetermined driving amount) set in advance (step S140). Herein, the number Sst of FB reading start steps is the number of steps required to move the carriage 34 from the home position HP to a position immediately before the carriage 34 reaching the leading end of the document 5 placed on the first platen glass 52 in she sub-scanning direction, that is, the number of steps required to move the carriage 34 from the home position HP to the reading start position PS illustrated in FIG. 2.

If it is determined that the number Sdh of driving steps reaches the predetermined number Sst of FB reading start steps (YES in step S140), the CPU turns on the light source 31 to start the reading of the document 5 placed on the first platen glass 12 (step S145). Herein, the processes of step S110, step S125, and step S145 correspond to a scanning moving process.

Next, the CPU 20 determines whether the number Sdh of driving steps of the motor 62 reaches the predetermined number Sen of FB reading end steps which has been set in advance (step S150). Herein, the number Sen of FB reading end steps is the number of steps required to move the carriage 34 from the home position HP to a position until the carriage 34 reaches the trailing end of the document 5 placed on the first platen glass 52 in the sub-scanning direction, that is, the number of steps required to move the carriage 34 from the home position HP to the reading end position PE illustrated in FIG. 2.

If it is determined that the number Sdh of driving steps reaches the predetermined number Sen of FB reading end steps (YES in step S150), the CPU reverses the rotation direction of the motor 62 to move the carriage 34 in the direction B illustrated in FIG. 2 (step S155). Then, if the reading unit 30 detects the boundary between the white tape 55A and the black tape 55B by the moving of the carriage 34 in the direction B to detect the home position HP (YES in step S160), the CPU 20 turns off the light source 31 (step S170) to terminate the process of executing the FB read mode and stops the driving of the motor to stop the moving of the carriage 34 at the home position HP (step S75). In this way, the document reading process is terminated.

Next, returning to step S40 in FIG. 6, and if it is determined that the reading start instruction is not the reading start instruction in the FB read mode (NO in step S40), it is determined whether the planetary gear 74C is at the ADF-side position at present (step S60). If it is determined that the planetary gear 74C is at the ADF-side position at present (YES in step S60), the process of the ADF read mode which will be described later is executed (step S70). On the other hand, if it is determined that, the planetary gear 74C is not at the ADF-side position at present (NO in step S60), the motor 62 is driven such that the planetary gear 74C revolves toward the ADF-side position (step S65). Then, it is determined whether the number Sdz of steps after driving the motor 62 reaches the number Sadf of ADF switching steps (step S66).

Herein, the number Sadf of ADF switching steps is the number of steps of ensuring that the planetary gear 74C is positioned at the ADF-side position. The number Sadf of ADF switching steps is, for example, the sum of the number Sb of steps required for moving the carriage 34 from the position (e.g., DP in FIG. 2) where the reading operation in the FB read mode at the previous mode is terminated to a position (i.e., ADF reading position RF) where the carriage 34 does not move physically, the number Sa of steps for revolving the planetary gear 74C from the FB-side position to the ADF-side position, and the number α of spare steps. That is, Sadf=Sb+Sa+α.

While it is determined that the number Sdz of steps after driving the motor 62 does not reach the number Sadf of ADF switching steps (NO in step S66), since there is a possibility that the planetary gear 74C is not positioned at the ADF-side position, the determination process of the step S66 is repeated until the number Sdz of steps after driving the motor 62 reaches the number Sadf of ADF switching steps. On the other hand, if it is determined that the number Sdz of steps after driving the motor 62 reaches the number Sadf of ADF switching steps (YES in step S66), it is regarded that the planetary gear 74C is at the ADF-side position. Therefore, the information of the read mode flag MFg which is 0 is recorded in the NVRAM 23 (step S68), the driving of the motor 62 is stopped (step S69), and the process of executing the ADF read mode is performed (step S70).

Figure 9:
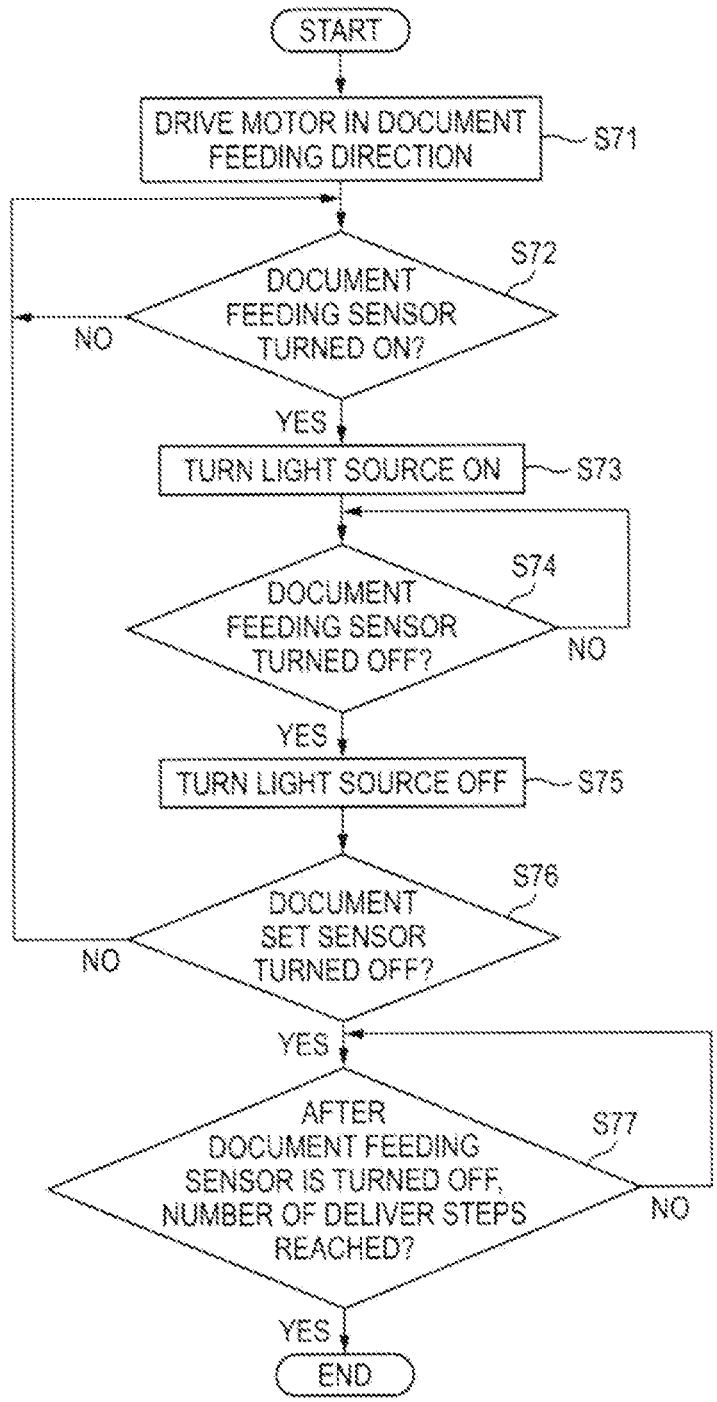
FIG. 9 is a flowchart illustrating an ADF read mode executing process.

In the process of executing the ADF read mode, as illustrated in FIG. 9, the CPU 20 first rotates the motor 62 in the document feeding direction to feed the document 5 placed on the document tray 42 to an Inside of the feeding path 43 (step S71). Then, when the document feeding sensor 47 is turned ON by the feeding of the document 5 by the feeding roller 44, that is, in a case where the document feeding sensor 47 detects a leading edge of the document 5 (YES in step S72), the light source 31 is turned on (step S73). As the document 5 is fed by the feeding roller 44, the document 5 is read by the reading unit 30 that is positioned at the ADF reading position RP when the document 5 passes the second platen glass 53.

When the document feeding sensor 47 is turned OFF, that is, in a case where the document feeding sensor 47 detects a trailing edge of the document 5 (YES in step S74), it is regarded that the reading of the document 5 is terminated, and thus the light source 31 is turned off (step S75). The CPU 20 determines whether there is no document 5 placed on the document tray 42 and the document set sensor 49 is turned OFF (step S76).

If it is not determined that the document set sensor 40 is turned OFF, that is, the document 5 still exists (NO in step S76) on the document tray 42, it returns to the process of step S72, and then the processes from step S72 to step S76 are repeated. On the other hand, if it is determined that there is no document 5 placed on the document tray 42 and the document set sensor 49 is turned OFF (YES in step S76), the CPU 20 determines whether the number of steps of driving the motor 62 after turning OFF the document set sensor 49 reaches the predetermined number of sheet discharge steps (step S77). If it is determined that the number of steps of driving the motor 62 after turning OFF the document set sensor 49 reaches the predetermined number of sheet discharge steps (YES in step S77), the final document 5 is regarded as being placed on the sheet discharge tray 46 by the sheet discharge roller 45, and the process of executing the ADF read mode is terminated. Incidentally, the number of sheet discharge steps is the number of steps of driving the motor 62 from the OFF time of the document set sensor 49 to the time when the document 5 is delivered onto the sheet discharge tray 46 by the sheet discharge roller 45, and is set in advance.

After the process of executing the FB read mode or the process of executing the ADF mode is terminated, the driving of the motor 62 is stopped (step S75 in FIG. 6), and the document reading process is terminated. Incidentally, if the document reading process is terminated, the CPU 20 restarts the document reading process and repeats the processes until the power source of the multi-function device 1 is interrupted.

5. Advantages

According to this exemplary embodiment, before the reading start instruction is received by the start switch 11A or the network interface 24, the prediction process is executed to predict whether the FB read mode (carriage read mode) will be executed. If it is predicted that the FB read mode will be executed, the motor 62 is driven such that the planetary gear 74C revolves toward the FB-side position (carriage-side positions). For this reason, in the case where the feeding units 44 and 45 and the carriage 34 are operated by one motor 62, that is, the reading operation by the ADF read mode and the reading operation by the FB read mode are carried out by switching one motor 62, the reading time in the FB read mode can foe shortened. That is, as compared with the case where the switching operation of the planetary gear 74C starts after the reading start instruction is received in the FB read mode, the reading time according to the exemplary embodiment can be shortened.

6. Modification to Exemplary Embodiments

The present invention is not limited to the above description and the exemplary embodiment illustrated in the accompanying drawings. For example, the following exemplary embodiments are included in the technical scope of the invention.

(1) In the above-described exemplary embodiment, the home position HP, at which the carriage 34 is stopped after the FB read mode is executed, and the ADF reading position RP, which is just below the second platen glass 53 and at which the carriage 34 is stopped after the ADF read mode is executed, are different. However, but the present invention is not limited thereto. For example, a mark for the HP detection may be provided at a portion facing the second platen glass 53 of the feeding path 43 of the ADF device 40, and the position at which the carriage 34 is stopped after the FB read mode is executed and the position at which the carriage 34 is stopped after the ADF read mode is executed may be the same position (RP illustrated in FIG. 2).

(2) In the above-described exemplary embodiment, in the case where the FB reading is predicted in the process of predicting the FB reading in FIG. 7, the planetary gear 74C is completely switched to the FB-side position in steps S34 and S36 in FIG. 7, but the present invention is not limited thereto. That is, if the FB reading is predicted, the process of switching the planetary gear 74C to the FB-side position is performed even a little.

For example, in steps S34 and S36, the number Sm (<Sa) of steps of setting the planetary gear 74C at the intermediate position between the ADF-side position and the FB-side position may be used alternative to the number Sfb of FB switching steps, and the process of step S38 may be omitted. In step S62 of FIG. 6, it may be determined whether the number Sfb of FB switching steps reaches (Sa+Sb−Sm). In this instance, after the reading start instruction in the FB read mode is input, since the motor 62 is moved by the number of steps (Sa+Sb−Sm), the reading time can be shortened as compared with the case where the motor 62 is moved by the number of steps (Sa+Sb).

(3) In the above-described exemplary embodiment, the process of step S20 in FIG. 6 may be omitted. That is, if the negative determination is obtained in step S15 in FIG. 6 (NO in step S15), the process of step S30 may be performed. In this instance, the reading time in the FB read mode can be shortened by the FB read predicting process.

(4) The above described exemplary embodiment illustrates an example where the determination of whether the planetary gear 74C is positioned at the FB-side position at present is carried out on the basis of the read mode flag MFg as the information about which read mode has been executed at the previous time. However, the present invention is not limited thereto. As the information about which read mode has been executed at the previous time, for example, the process may be performed on the basis of the difference between motor control manners at the document reading, for example, the difference in the number of steps of driving the motor 62.

In addition, the present invention is not limited to that determining whether the planetary gear 74C is positioned at the FB-side position at present is carried out on the basis of the information about which read mode has been executed at the previous time. For example, it may be determined by detecting the position of the planetary gear 74C by use of a dedicated sensor.

(5) The above-described exemplary embodiment an example where the planetary gear 74C in the planetary gear mechanism 74 is used as the switching gear. However, the present invention is not limited thereto. As the switching gear, other known configuration which is switched between the carriage-side position (FB-side position), in which the motor-side transmission gear 71 and the feeding unit-side transmission gear 73 are coupled, and the feeding unit-side position (ADF-side position), in which the motor-side transmission gear 71 and the feeding unit-side transmission gear 73 are coupled, may be used.

What is claimed is:

1. An image reading device comprising:
   a reading unit configured to read an image of a document;
   a feeing unit configured to feed the document;
   a carriage configured to hold and move the reading unit in a predetermined direction;
   a motor;
   a motor-side transmission gear configured to transmit power supplied from the motor;
   a feeding unit-side transmission gear configured to transmit the power to the feeding unit;
   a carriage-side transmission gear configured to transmit the power to the carriage;
   a switching gear configured to be switched between a carriage-side position, in which the motor-side transmission gear and the carriage-side transmission gear are coupled, and a feeding unit-side position, in which the motor-side transmission gear and the feeding unit-side transmission gear are coupled;
   a reading table, on which the document is configured to be placed in the carriage read mode;
   a detection member configured to be used for detecting a home position and provided between the reading table and a feeding unit reading position, in which the carriage is positioned in the feeding unit read mode to read the document fed by the feeing unit; and
   a control unit configured to perform:
      a prediction process of predicting whether a carriage read mode, in which the reading unit reads the image while being moved by the carriage, will be executed before a receiving unit receives a reading start instruction of the image by the reading unit; and
      a switching process of switching the switching gear to the carriage-side position in a case where the carriage read mode is predicted to be executed by the prediction process, wherein in a case where the feeding unit read mode has been executed at the previous time and the carriage read mode is executed at a present time, the control unit is configured to perform a scanning moving process comprising:
    moving the carriage from the feeding unit reading position in a direction toward the home position by driving the motor in the same direction as the driving direction of the motor in the switching process and controlling the reading unit to read the detection member so as to detect the home position; and
    controlling the reading unit to start reading and scanning of the document when a driving amount of driving the motor reaches a predetermined driving amount after detecting the home position by the reading unit, and
wherein the driving amount of the motor in the switching process is less than a sum of a first driving amount for moving the switching gear from the feeding unit-side position to the carriage-side position, and a second driving amount for moving the carriage from the feeding unit read position to the home position.

2. An image forming apparatus comprising:
the image reading device according to claim 1; and
an image forming unit configured to form the image on a recording medium on the basis of the image data of the image read by the image reading device.

3. The image reading device according to claim 1,
wherein the control unit is configured to further perform a determination process of determining whether the switching gear is at the carriage-side position, and
wherein when it is determined in the determination process that the switching gear is not at the carriage-side position, the control unit is configured to perform the switching process.

4. The image reading device according to claim 3,
wherein in the determination process, the control unit is configured to determine whether the switching gear is at the carriage-side position on the basis of information about which read mode has been executed at a previous time among the carriage read mode and a feeding unit read mode, in which the document fed by the feeding unit is read.

5. The image reading device according to claim 1, further comprising:
a reading table, on which the document is configured to be placed in the carriage read mode;
a cover configured to cover the reading table; and
a cover sensor configured to detect an opening and closing state of the cover,
wherein the control unit is configured to predict that the carriage read mode will be executed in a case where a detection result by the cover sensor is changed in the prediction process.

6. The image reading device according to claim 5,
wherein in a case where the detection result by the cover sensor is not changed in the prediction process, the control unit is configured to predict that the carriage read mode will be executed when the receiving unit receives a selection of a function related to the carriage read mode.

7. An image reading device comprising:
a reading unit configured to read an image of a document;
a feeing unit configured to feed the document;
a carriage configured to hold and move the reading unit in a predetermined direction;
a motor;
a motor-side transmission gear configured to transmit power supplied from the motor;
a feeding unit-side transmission gear configured to transmit the power to the feeding unit;
a carriage-side transmission gear configured to transmit the power to the carriage;
a switching gear configured to be switched between a carriage-side position, in which the motor-side transmission gear and the carriage-side transmission gear are coupled, and a feeding unit-side position, in which the motor-side transmission gear and the feeding unit-side transmission gear are coupled; and
a control unit configured to perform:
    a prediction process of predicting whether a carriage read mode, in which the reading unit reads the image while being moved by the carriage, will be executed before a receiving unit receives a reading start instruction of the image by the reading unit; and
    a switching process of switching the switching gear to the carriage-side position in a case where the carriage read mode is predicted to be executed by the prediction process,
wherein the switching gear comprises a planetary gear mechanism comprising:
    a transmission gear configured to be meshed with the motor-side transmission gear;
    a sun gear configured to rotate together with the transmission gear, wherein the transmission gear and the sun gear are configured to rotate around the same shaft; and
    a planetary gear configured to be meshed with the sun gear and to turn and revolve around the sun gear in accordance with a rotation of the sun gear, and
wherein a position of the planetary gear is configured to be switched between the carriage-side position where the planetary gear mechanism is meshed with the motor-side transmission gear and the carriage-side transmission gear so as to transmit the power from the motor to the carriage and the feeding unit-side position where the planetary gear mechanism is meshed with the motor-side transmission gear and the feeding unit-side transmission gear so as to transmit the power from the motor to the feeding unit.

8. An image forming apparatus comprising:
the image reading device according to claim 7; and
an image forming unit configured to form the image on a recording medium on the basis of the image data of the image read by the image reading device.

\* \* \* \* \*